United States Patent
Ren et al.

(10) Patent No.: US 9,589,386 B2
(45) Date of Patent: Mar. 7, 2017

(54) SYSTEM AND METHOD FOR DISPLAY OF A REPEATING TEXTURE STORED IN A TEXTURE ATLAS

(71) Applicant: Robert Bosch GmbH, Stuttgart (DE)

(72) Inventors: Liu Ren, Cupertino, CA (US); Lincan Zou, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 373 days.

(21) Appl. No.: 14/209,192

(22) Filed: Mar. 13, 2014

(65) Prior Publication Data
US 2014/0267346 A1 Sep. 18, 2014

Related U.S. Application Data

(60) Provisional application No. 61/791,282, filed on Mar. 15, 2013.

(51) Int. Cl.
*G06T 11/00* (2006.01)
*G06T 15/04* (2011.01)

(52) U.S. Cl.
CPC .......... *G06T 15/04* (2013.01); *G06T 2210/36* (2013.01)

(58) Field of Classification Search
CPC ........ G06T 11/001; G06T 15/04; G06T 11/00
See application file for complete search history.

(56) References Cited

U.S. PATENT DOCUMENTS

| 6,750,862 B1 | 6/2004 | Shaw et al. |
| 7,245,305 B2 | 7/2007 | Lake et al. |
| 2005/0088450 A1 | 4/2005 | Chalfin et al. |
| 2008/0144943 A1* | 6/2008 | Gokturk ............. G06F 17/3025 382/224 |
| 2009/0167776 A1 | 7/2009 | Barenbrug |

FOREIGN PATENT DOCUMENTS

KR 20100072729 A 7/2010

OTHER PUBLICATIONS

Aurelien Ribon, "Texture Packer" download page, Aug. 15, 2012. pp. 1. https://code.google.com/archive/p/libgdx-texturepacker-gui/downloads.*

(Continued)

*Primary Examiner* — Xiao Wu
*Assistant Examiner* — Chong Wu
(74) *Attorney, Agent, or Firm* — Maginot Moore & Beck LLP

(57) ABSTRACT

In one embodiment, a method for generating textured graphics includes identifying border colors of pixels around two texture images and generating arrangements of border texels from the border colors that are positioned next to the two images in a texture atlas. The method includes generating mip-maps of the texture atlas with texels in the jump level assigned with the border color of the corresponding textures in the full-resolution texture atlas instead of the averaged color of the textures that would be assigned using a traditional mip-map process. The method includes storing the texture atlas including the two texture images and the border texels in a memory for use in generating repeated textures on an object in a virtual environment using at least one of the texture images with a mip-map without seam artifacts between the repeated textures.

12 Claims, 8 Drawing Sheets

(56) References Cited

OTHER PUBLICATIONS

Aurelien Ribon, "Texture Packer" developers guide, Dec. 10, 2014. pp. 1-7. https://github.com/libgdx/libgdx/wiki/Texture-packer.*
Kork, "What does the border-mipmaps setting actually do?", Jul. 16, 2009. pp. 1. http://forum.unity3d.com/threads/what-does-the-border-mipmaps-setting-actually-do.26633/.*
Danijar, "How to avoid texture bleeding in a texture atlas?", Jan. 7, 2013. pp. 1-5. http://gamedev.stackexchange.com/questions/46963/how-to-avoid-texture-bleeding-in-a-texture-atlas.*
International Search Report and Written Opinion corresponding to PCT Application No. PCT/US2014/026463, mailed Jun. 20, 2014 (9 pages).
Purnomo, Budirijanto et al., Seamless Texture Atlases, Eurographics Symposium on Geometry Processing, 2004.
Emulating texture wrapping on sub-rectangle of texture atlas—Graphics Programming and Theory, http://www.gamedev.net/topic/491189-emulating-texture-wrapping-on-su . . . , published as early as Mar. 15, 2012.
Building Atlases, http://www.anbsoft.com/middleware/ezgui/docs/page5/page5.html, published as early as Mar. 15, 2012.
How to use GL_REPEAT to repeat only a selection of a texture atlas? (OpenGL), http://stackoverflow.com/questions/662107/how-to-use-gl-repeat-to-repeat-only-a-selection-of-a-texture-atlas-opengl, published as early as Mar. 15, 2012.
I just got texture tiling with a texture atlas working, they said it was impossible, http://www.gamedev.net/topic/438831-i-just-got-texture-tiling-with-a-tex . . . , published as early as Mar. 15, 2012.
Is possible to tile within a texture atlas?—Unity Answers, http://answers.unity3d.com/questions/214837/is-possible-to-tile-within-a . . . , published as early as Mar. 15, 2012.
Bayona, Jonas Martinez, Slides for Space-Optimized Texture Atlas, Master Thesis, Universitat Politècnica de Catalunya, Aug. 9, 2009 (51 pages).
Zwicker, Matthias, CSE168, Computer Graphics II: Rendering Texture Filtering and Mip-Mapping, published as early as Mar. 15, 2012.
Powervr SGX.OpenGL ES 2.0 Application Development Recommendations.1.8f.External.doc, Imagination Technologies, Aug. 3, 2009.
Kim, Sujeong, A Space-efficient and Hardware-friendly Implementation of Ptex, published as early as Mar. 15, 2012.
Ronacher, Armin, Simple Texture Atlases, Armin Ronacher's Game and Graphics Development Adventures, http://immersedcode.org/2011/4/11/texture-atlases/, Apr. 11, 2011.
Texture atlas and repeating textures, OpenGL, http://www.opengl.org/discussion_boards/showthread.php/162702-Textu, published at least as early as Mar. 15, 2012.
Improving Batching Using Texture Atlases, 2004, Nvidia Corporation.
Bayona, Jonas Martinez, "Master Thesis: Space-Optimized Texture Atlases," Sep. 8, 2009 (98 pages).

* cited by examiner

```
Vertex Shader

1:      attribute vec4 a_position;
2:      attribute vec4 a_texEncode;
3:      varying vec4 v_texEncode;
4:      void main()
5:      {
6:          gl_Position = a_position;
7:          v_texEncode = a_texEncode;
8:      }
```

FIG. 8A

```
Fragment Shader

1:   precision mediump float;
2:   varying vec4 v_texEncode;
3:   uniform sampler2D s_baseMap;
4:   void main()
5:   {
6:   //assume texture tiles in atlas are 4 X 4
7:      vec2 x = v_texEncode.xy;
8:   //For NxN texture tiles, use vec2(1/N, 1/N)
9:      vec2 s = vec2(0.25, 0.25);
10:     vec2 t = v_texEncode.zw;
11:     vec2 texcord = fract(x) * s + t;
12:     gl_FragColor = texture2D(s_baseMap, texcord);
13:  }
```

FIG. 8B

SYSTEM AND METHOD FOR DISPLAY OF A REPEATING TEXTURE STORED IN A TEXTURE ATLAS

CLAIM OF PRIORITY

This application claims priority to U.S. Provisional No. 61/791,282, which is entitled "System And Method For Display Of A Repeating Texture Stored In A Texture Atlas," and was filed on Mar. 15, 2013, the entire contents of which are hereby incorporated by reference herein.

FIELD

This disclosure relates generally to the field of computer graphics and, more specifically, to systems and methods for generating repeated texture patterns in three-dimensional computer graphics.

BACKGROUND

Many modern software applications display three-dimensional representations of objects and scenes as part of a user interface. Three-dimensional (3D) graphics are used in a wide range of applications including games, simulations, virtual reality applications, geospatial information applications, and applications for mapping and navigation. In many applications, 3D graphics are more useful than two-dimensional (2D) graphics at depicting real-world environments and locations because the normal interaction between humans and the real-world occurs in three dimensions.

In one form of 3D graphics, different objects in a scene are formed from a large number of polygons. The polygons form shapes and structures in a 3D scene. Since most computing devices only display graphics with a two-dimensional display, the 3D graphics are converted into a rasterized array of two-dimensional pixels for display. The 2D display depicts portions of the three-dimensional scene in a similar manner to how a camera takes a two-dimensional photograph of 3D scenes in the real world. The portal through which the 2D display depicts a 3D virtual environment is referred to as a "view frustum", and objects in the virtual environment appear to be at different distances from the view frustum. Many 3D graphics systems and application programming interfaces (APIs) including the Open Graphics Library (OpenGL) and the Direct 3D APIs provide common structures and interfaces to specialized graphics hardware for generation of 3D images in an efficient manner. The 3D software interacts with general purpose and specialized digital computing hardware that generates the 3D graphics in an efficient manner. In particular, graphical processing units (GPUs) are hardware components that are configured to generate polygons and other graphical effects that form a 3D scene. Modern computing devices typically execute software with a combination of instructions for a central processing unit (CPU) and the GPU to generate the 3D scene and enable interaction with the 3D scene in some software applications. In some hardware embodiments, the functionality of the CPU and GPU are merged together, physically and optionally logically, into a single a system on a chip (SoC) device.

In modern 3D graphics, the final display includes additional graphical details that go beyond a simple rendering of polygons to provide additional detail and realism. For example, rendered polygons typically receive one or more textures that simulate the appearance of materials in the real world such as wood, stone, metal, cloth, and many other materials. In many embodiments, a texture is a two-dimensional drawing or photograph of a material that is applied to surfaces of 3D objects to give the three-dimensional objects a more realistic appearance. In some instances, a texture is applied to the surfaces of a 3D object in a repeated pattern. For example, a brick texture is repeated multiple times across a surface of a polygon to give the appearance of a brick wall with a repeated pattern of bricks.

Many software applications that model 3D objects us a large number of textures. Due to memory access patterns that are commonly used with 3D APIs such as OpenGL, many 3D applications store multiple textures in one or more texture atlases. Each texture atlas is a larger 2D image that includes multiple individual textures arranged within the larger 2D image. The 3D software application stores coordinates for the individual textures within the texture atlas and can retrieve only selected portions of the texture from the texture atlas for mapping to 3D objects. The texture atlas provides a performance benefit because the atlas stores multiple textures in a single contiguous block of memory. Loading a single texture atlas into memory and applying textures from the atlas to one or more 3D objects is more efficient than loading individual textures into separate memory addresses for each of the objects.

As describe above, existing 3D software and hardware enables repetition of a texture across the surfaces of a 3D object and enables the use of texture atlases for efficient access to multiple textures. Existing 3D systems, however, do not provide efficient mechanisms to enable repeated textures to be formed across objects when the textures are stored in a larger texture atlas. For example, the OpenGL API provides texture wrapping functionality with a parameter (GL_REPEAT) that specifies repetition of a texture over the surface of a 3D object. The OpenGL texture wrapping functionality is not compatible with texture atlases, however, because the texture wrapping functionality wraps the entire texture atlas over the surface of the 3D object instead of merely wrapping a selected texture from the texture atlas. More complex methods for extracting textures from a texture atlas using programmable shaders exist, but the existing solutions suffer from artifacts when a mip-map process is used to render textures over a range of sizes and distances from the foreground of a 3D scene. Mip-mapping is a commonly used process in 3D graphics, and the existing methods for rendering repeated textures that are retrieved from texture atlases produce visible artifacts that appear as seams between copies of the repeated texture graphics. Consequently, improved methods of mapping repeated textures to 3D objects that enable use of texture atlases with mip-mapped textures would be beneficial.

SUMMARY

In one embodiment, method for encoding/decoding of textures in a texture atlas enables fast repetitive texture mapping with high image quality for display of mip-mapped textures. The texture atlas contains both repetitive texture tiles and non-repetitive texture tiles. Both non-repetitive textures and repetitive textures can be stored in the texture atlas. The atlas contains textures corresponding to a plurality of 3D objects in a scene, which enables a 3D graphics processor render all of the objects, including applied textures from the texture atlas, using one drawing call. Therefore, compared with the standard solutions that have to use many drawing calls to render the 3D objects with repetitive patterns, the method uses a single drawing call to fulfill the task, which speeds up the rendering performance of the graphics processor. The improved rendering performance is useful in a wide range of applications including embedded and mobile computing devices and software applications. For example, a mobile computing device generates 3D graphics for a navigation system that renders buildings in a city and other map features with highly detailed graphics models.

Because many buildings and other 3D objects contain both complex (non-repetitive) and synthetic repetitive textures, the texture atlas enables a high compression rate and reduced the storage cost to store these textures and to render the graphics in an efficient manner. For example, if windows of a building are similar in terms of color and shape, the texture atlas includes an image of one window, and the system renders all the windows of the building in a repetitive manner. In one embodiment, the repetitive texture mapping process is implemented using modified texture mapping procedures with the OpenGL ES 2.0 shading language.

In one embodiment, a method for using a processor to apply repeated textures to a surface of an object in 3D virtual environment using a texture atlas has been developed. The method includes identifying a first border of pixels having a first color around a first image including a first plurality of pixels formed in a first rectangle, identifying a second border of pixels having a second color around a second image including a second plurality of pixels formed in a second rectangle, generating with the processor a third plurality of texels having the first color, generating with the processor a fourth plurality of texels having the second color, generating with the processor a texture atlas including a two-dimensional arrangement of texels including the first image with the third plurality of texels positioned on at least one side of the first image and the second image with the fourth plurality of texels positioned on at least one side of the second image, and storing the texture atlas in a memory to enable generation of repeated textures using mip-mapping on an object in a virtual environment using at least one of the first image and the second image as a repeated texture without seam artifacts between repeated textures.

In another embodiment, a computing system that applies repeated textures to a surface of an object in 3D virtual environment using a texture atlas has been developed. The system includes a memory and a processor operatively connected to the memory. The processor is configured execute stored program instructions in the memory to identify a first border of pixels having a first color around a first image stored in the memory, the first image including a first plurality of pixels formed in a first rectangle, identify a second border of pixels having a second color around a second image stored in the memory, the second image including a second plurality of pixels formed in a second rectangle, generate a third plurality of texels having the first color, generate a fourth plurality of texels having the second color, generate a texture atlas including a two-dimensional arrangement of texels including the first image with the third plurality of texels positioned on at least one side of the first image and the second image with the fourth plurality of texels positioned on at least one side of the second image, and store the texture atlas in the memory for generation of repeated textures using mip-mapping on an object in a virtual environment using at least one of the first image and the second image as the repeated texture without seam artifacts between the repeated textures.

BRIEF DESCRIPTION OF THE DRAWINGS

FIG. 8A is a program listing for a vertex shader program that is used to generate texture coordinates for interpolation into per-fragment values.

FIG. 8B is a program listing for a fragment shader program that selects the texture from the texture atlases of FIG. 6 and FIG. 7 based on the per-fragment texture coordinates interpolated from the per-vertex texture coordinates from vertex shader program of FIG. 8A and applies the selected texture to a surface of an object in a repeated manner without seams between the repeated textures.

DETAILED DESCRIPTION

For the purposes of promoting an understanding of the principles of the embodiments disclosed herein, reference is now be made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

Figure 1:
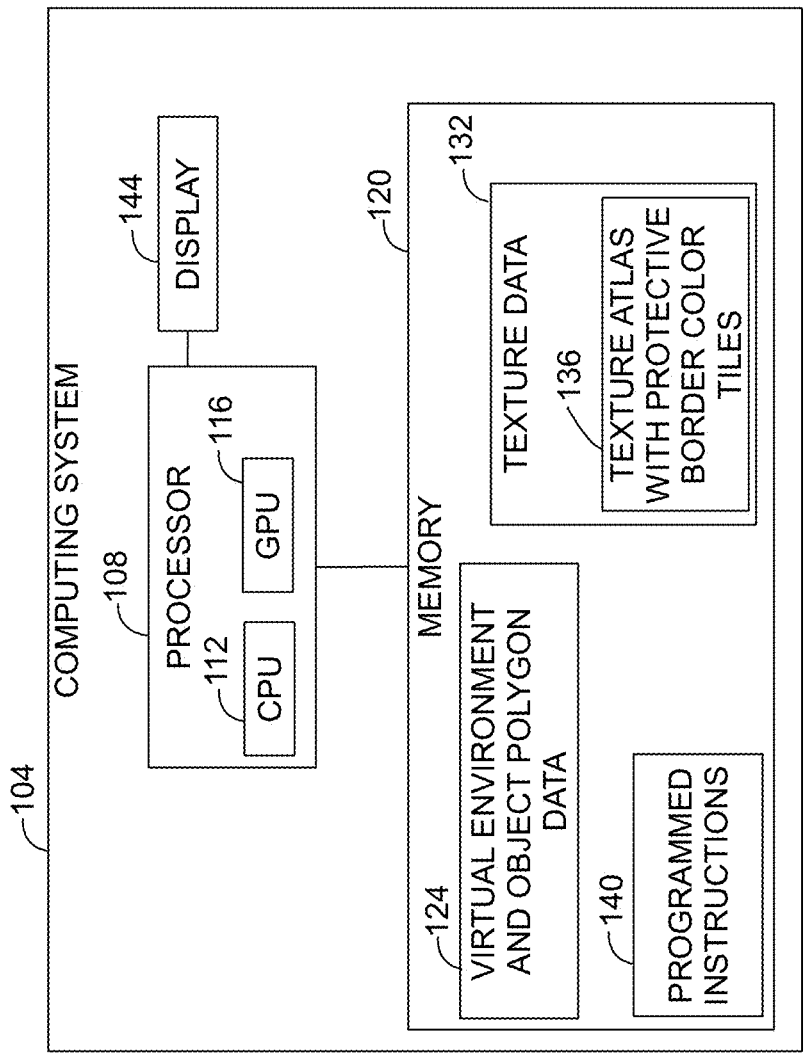
FIG. 1 is a schematic diagram of a computing system that is configured to use a texture atlas with protective border color tiles for efficient application of repeated textures to objects in a 3D virtual environment.

FIG. 1 depicts a computing system 104 that generates a graphical display of a 3D virtual environment including a representation of ground, such as the surface of the Earth, with ground lighting and wall lighting textures applied to the regions surrounding the structures and to the polygons that depict walls of the structures. The computing system 104 includes a processor 108, memory 120, and a display 144. In one embodiment, the computing system 104 is an in-vehicle information system that is used for the display of 3D graphics in conjunction with operation of the vehicle. In other embodiments, the computing system 104 is an embedded system or a mobile electronic device. Hardware embodiments of the computing system 104 include, but are not limited to, personal computer (PC) hardware, embedded system hardware including embedded computing hardware for use in a motor vehicle, and mobile electronic devices including smartphone and tablet computing devices.

In the computing system 104, the processor 108 includes one or more integrated circuits that implement the functionality of a central processing unit (CPU) 112 and graphics processing unit (GPU) 116. In some embodiments, the processor is a system on a chip (SoC) that integrates the functionality of the CPU 112 and GPU 116, and optionally other components, including the memory 120, into a single integrated device. In one embodiment, the CPU is a commercially available central processing device that implements an instruction set such as one of the x86, ARM, Power, or MIPS instruction set families. The GPU 116 includes hardware and software for display of both 2D and 3D graphics. In one embodiment, processor 108 executes software drivers and includes hardware functionality in the GPU 116 to generate 3D graphics using the OpenGL, OpenGL ES, or Direct3D graphics application programming interfaces (APIs). For example, the GPU 116 includes one or more hardware execution units that implement geometry shaders, fragment shaders, and vertex shaders for the processing and display of 2D and 3D graphics. During operation, the CPU 112 and GPU 116 in the processor 108 execute stored programmed instructions 140 that are retrieved from the memory 120. In one embodiment, the stored programmed instructions 140 include operating system software and one or more software application programs that generate 3D graphics, including mapping and navigation applications, virtual reality applications, game applications, simulation applications, and any other software that is configured to generate 3D graphics. The processor 108 executes the mapping and navigation program and generates 2D and 3D graphical output corresponding to maps and map features through the display device 144. The processor 108 is configured with software and hardware functionality by storing programmed instructions in one or memories operatively connected to the processor and by operatively connecting the hardware functionality to the processor and/or other electronic, electromechanical, or mechanical components to provide data from sensors or data sources to enable the processor to implement the processes and system embodiments discussed below.

The memory 120 includes both non-volatile memory and volatile memory. The non-volatile memory includes solid-state memories, such as NAND flash memory, magnetic and optical storage media, or any other suitable data storage device that retains data when the computing system 104 is deactivated or loses electrical power. The volatile memory includes static and dynamic random access memory (RAM) that stores software and data, including graphics data and map feature data, during operation of the computing system 104. In addition to the programmed instructions 140, the memory 120 includes virtual environment and object polygon data 124, texture data 132, and stored programmed instructions 140. The virtual environment and object polygon data 124 includes a model of a virtual environment with ground terrain information, coordinates and orientation data for multiple 3D objects that are located in the virtual environment, and additional environmental data including virtual lighting sources that illuminate the virtual environment. The object data include vertices with three-dimensional coordinates that define a series of interconnected polygons, such as triangles, that form the shape of structures in the 3D virtual environment.

In the memory 120, the texture data 132 include a plurality of textures, which are typically 2D images. In the texture data 132, a texture atlas 136 includes a single image that incorporates multiple smaller texture images. As described in more detail below, the texture atlas data 136 include protective border color tiles around the borders of the individual textures in the atlas. The border tiles enable the processor 108 to apply repeated patterns of filtered and mip-mapped textures that are extracted from the texture atlas data 136 in an efficient manner while avoiding visible seams and other image artifacts.

In the computing system 104, the display 144 is either an integrated display device, such as an LCD or other display device, which is integrated with a housing of the computing system 104, or the display 144 is an external display device that is operatively connected to the computing system 104 through a wired or wireless interface to receive output signals from the processor 108 to generate a display of the 3D virtual environment. In an embodiment where the computing system 104 is an in-vehicle embedded computing device, the display 144 is an LCD or other flat panel display that is located in the console of a vehicle, or the display 144 is a head-up display (HUD) or other projection display that displays the 3D virtual environment on a windshield or other display surface in the vehicle.

Figure 2:
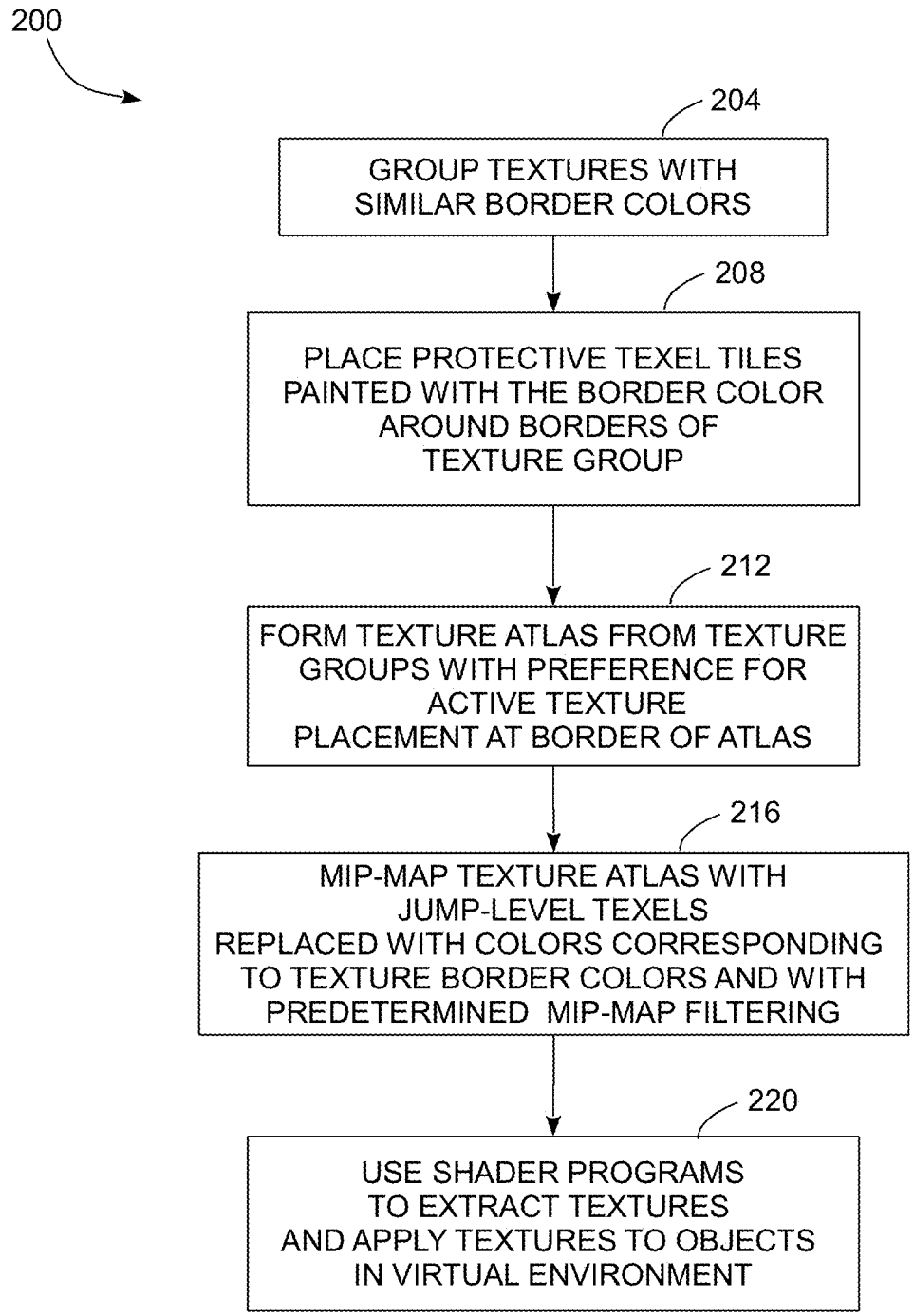
FIG. 2 is a block diagram of a process for generation of the texture atlas with protective border color tiles.

FIG. 2 depicts a process 200 for generation of the texture atlas with protective border tiles that is used in the computing system 104. In the description below, a reference to the process 200 performing or doing some function or action refers to one or more controllers or processors that are configured with programmed instructions, which are executed by the controllers or processors to implement the process performing the function or action or operating one or more components to perform the function or action. The process 200 is described with reference to the computing system 104 for illustrative purposes.

Figure 6:
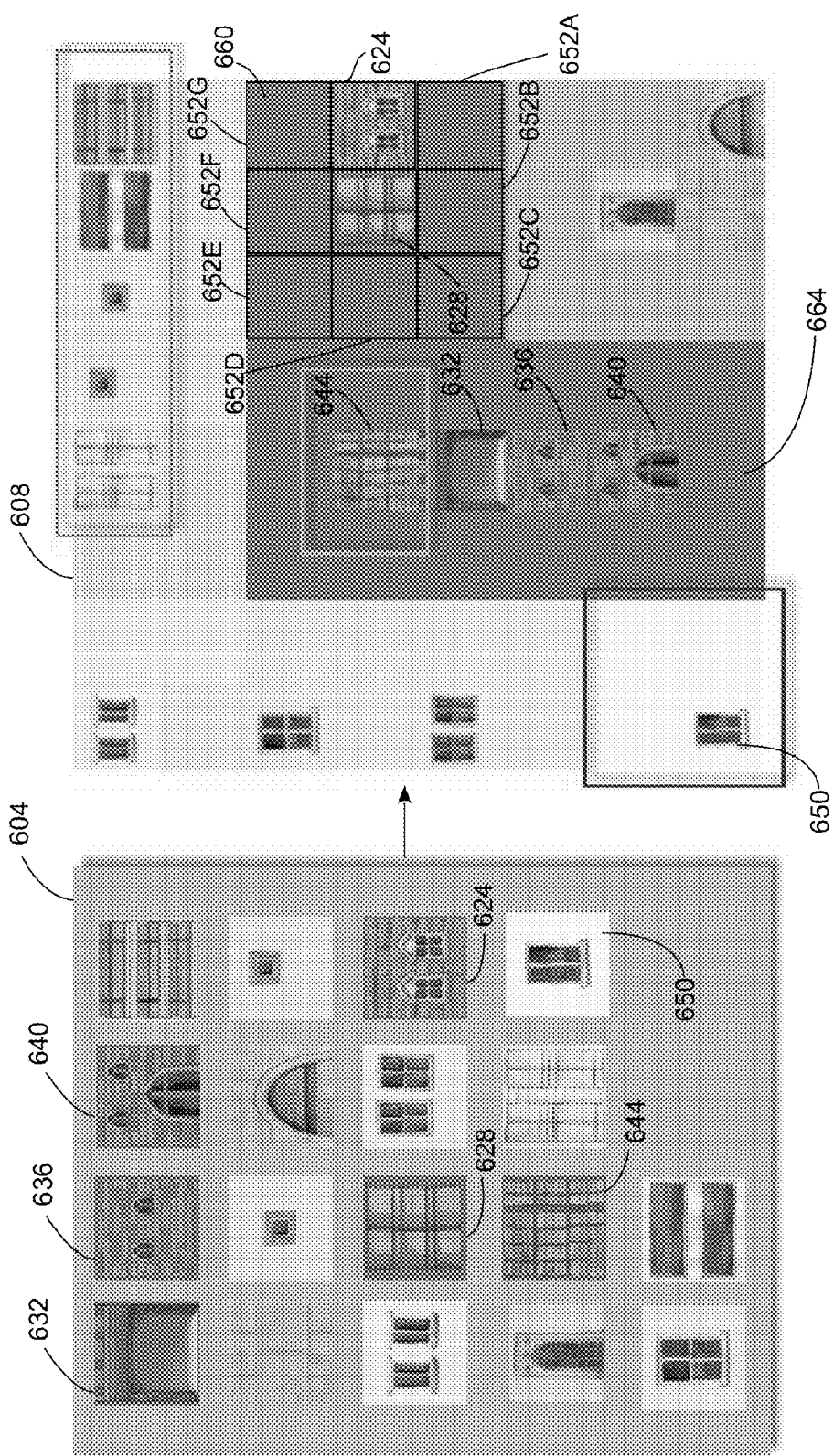
FIG. 6 is a depiction of individual textures and a texture atlas that arranges the individual textures with border color tiles in a space efficient manner.

During process 200, the processor 108 receives multiple textures, which are each formed from two-dimensional images in one embodiment. The processor 108 groups together individual textures that have the same or similar border colors (block 204). For example, FIG. 6 depicts a set of textures 604 that are arranged into a completed texture map 608 using process 200. Each of the textures in the texture map 608 is formed from a rectangular arrangement of texels. As used herein, the term "texel" refers to an element of a texture atlas and the term "pixel" refers to an element of an image. The texture atlas comprises multiple images whose pixels are referred to as texels when the images are included within the texture atlas. The texture atlas also includes protective border tiles including texels that form borders around the images in the texture atlas. As described below, a texel from a texture can be applied to change the colors of one or more pixels on the surface of an object that is rendered in a virtual environment. The individual textures 604 are formed with a single border color in each of the texels at the boundary of the texture, although different textures use different border colors. In the set of textures 604, the textures 624 and 628 have same border colors. Another group of textures 632, 636, 640, and 644 also share same border colors. In some instances, an individual texture does not have a border color that matches or is similar to other border colors, and the texture remains ungrouped from other textures. For example, the texture 650 in FIG. 6 is not grouped with other textures.

During process 200, the grouping of textures with similar colors enables arrangement of the textures together with protective rectangular border tiles around the borders of the texture group. Process 200 continues as the processor 108 generates protective border tiles that are arranged around the grouped textures (block 208). Each border tile is a predetermined set of texels, typically in a rectangular configuration, that shares the border color of the grouped textures. As described in more detail below, the protective border tiles reduce image artifacts that are generated during filtering processes where a filtering kernel operates on a region of texels instead of only a single texel, and during mip-mapping of the full texture atlas 608 when multiple textures in the texture atlas would produce inaccurate colors at various mip-map levels.

In some embodiments, each tile of the border color texels has the same length and width dimensions as the corresponding texture that is placed next to the border tile. For example, in FIG. 6 the border tiles 652A-652G that are positioned on different sides of the texture 628 each have the same length and width as the texture graphic 628. The textures 624 and 628 each have the same border color and the processor 108 positions the textures 624 and 628 next to each other so that some of the border tiles, such as the tiles 652A, 652B, 652F, and 652G act as border tiles for both of the textures 624 and 628. When arranged together, the grouped textures require fewer border tiles than are required for individual textures. For example, in FIG. 6, the region 664 in the texture atlas 608 includes the textures 632-644 that are arranged adjacent to one another with border tiles surrounding the group of textures. Similarly, the textures 624 and 628 are grouped together with protective border tiles in the region 660.

While the texture atlas 608 includes multiple textures and border tiles that are configured to enable the process 108 to use of the textures as repeated patterns on objects in a 3D virtual environment, the texture atlas 608 is also suitable for use in the application of non-repeated textures. Thus, during operation the processor 108 optionally binds a single texture atlas using the border tiles as depicted in FIG. 6 that is used for both the application of repeated textures and for non-repeated textures on the surface of objects in a 3D virtual environment.

Figure 4:
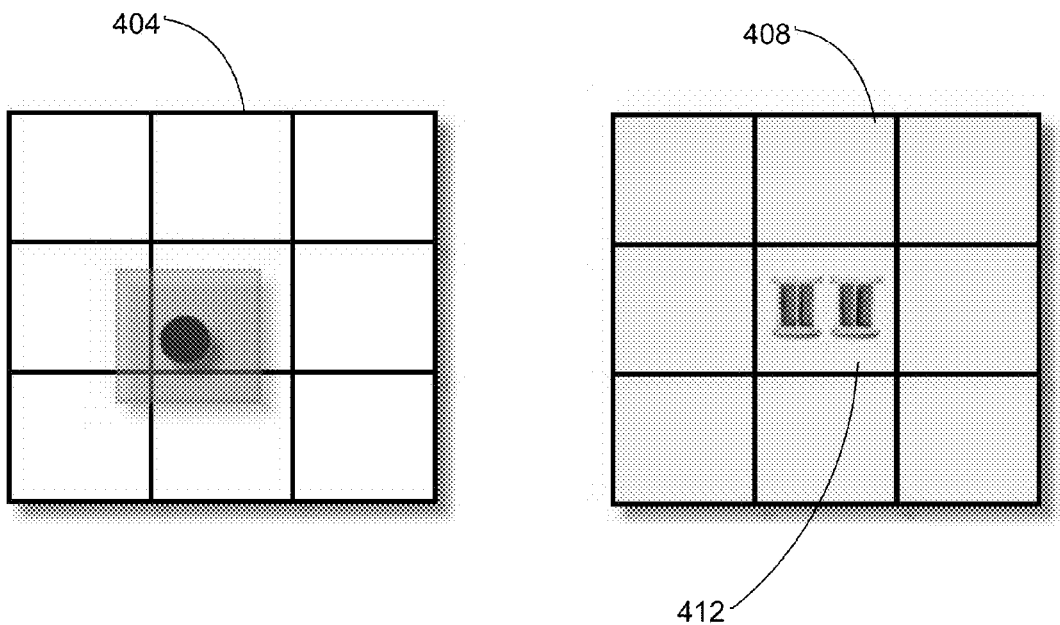
FIG. 4 is a depiction of a texture including border color tiles around the texture.

FIG. 4 depicts linear filtering around a texture in greater detail. The grid 404 illustrates the concept of linear filtering of each texel. Linear filtering uses neighboring texels to determine the final color of the textured pixel that is displayed using the display device 144. A textured pixel refers to a pixel that has a color based on the application of texels from the mip-maps that are generated from the texture atlas. Thus, there is a chance that final color is affected by accessing neighboring texture tiles in the atlas. The grid 408 illustrates the protective texture tiles. In order to avoid the color pollution, each working texture tile, such as the texture tile 412, is formed with a border color that is shared by the eight neighbour texture tiles, which are called protective texture tiles.

Referring again to FIG. 2, process 200 continues as the processor 108 forms the texture atlas with a preference in favor of placing textures at the exterior sides of the texture atlas instead of border tiles in situations where the placement is feasible (block 212). The placement of textures on the exterior sides of the texture atlas reduces the number of border tiles that are required, which reduces the total size of the texture atlas. In FIG. 6, the textures 624 and 650 are placed on the exterior sides of the texture atlas 608, and do not require the placement of additional border tiles on the sides of the textures that form the exterior sides of the texture atlas 608.

While the processing described above with reference to blocks 204-212 is described in conjunction with the computing system 104 for illustrative purposes, in another embodiment an external computing device generates the texture atlas data 136 using the process 200. The data corresponding to the texture atlas 136 are then stored in the texture data 132 of the computing device 104, and the computing device 104 uses the texture atlas to apply repeated textures to objects in the virtual environment and object polygon data 124 in an efficient manner.

Process 200 continues with generation of mip-maps with corresponding mip-map jump level that match the border colors of the textures in the texture atlas (block 216). During operation of the computing system 104, the processor 108 performs a mip-mapping process using the texture atlas. Mip-mapping is a process that is known to the art for depicting a single texture at varying levels of detail. For example, a single texture when displayed with a large size in a virtual environment depicts a greater level of detail with a large number of texels forming fine details in the texture, while the same texture viewed at a great distance in a virtual environment may be represented by only a single texel representing the entire texture. Mip-mapping, in conjunction with filtering processes, enables display of a single texture with varying levels of detail. During a mip-map process, the processor 108 generates smaller versions of the texture atlas data 136, with a common mip-map process generating smaller versions that shrink by a factor of two in each linear dimension from the next larger sized texture, so that each mip-map texture (also referred to as a mip-map level) with ¼ the resolution of the next larger mip-map.

The processor 108 applies filters to the texels from one or more of the mip-map level graphics to generate the texture texels for an object in a virtual environment. Since the selected level of detail for an object is often between the levels of detail for the textures in two different mip-map levels, the processor 108 uses various filtering techniques that are known to the art to generate the texture texels based on corresponding texels from two or more mip-map levels. The individual images that are produced during the mip-map process are often referred to as being in different mip-map "levels". The lowest mip-map level refers to the original texture image at full resolution, while one or more additional "levels" are formed from images with progressively lower resolution levels. The "highest" mip-map level corresponds to the lowest resolution image that is generated during the mip-mapping process. In a texture atlas that can be divided into a set of tiles, some mip-map embodiments generate the highest mip-map level image including a single texel representing each tile in the full-resolution lowest mip-map level. The highest mip-map level is also referred to as a "jump level."

Figure 7:
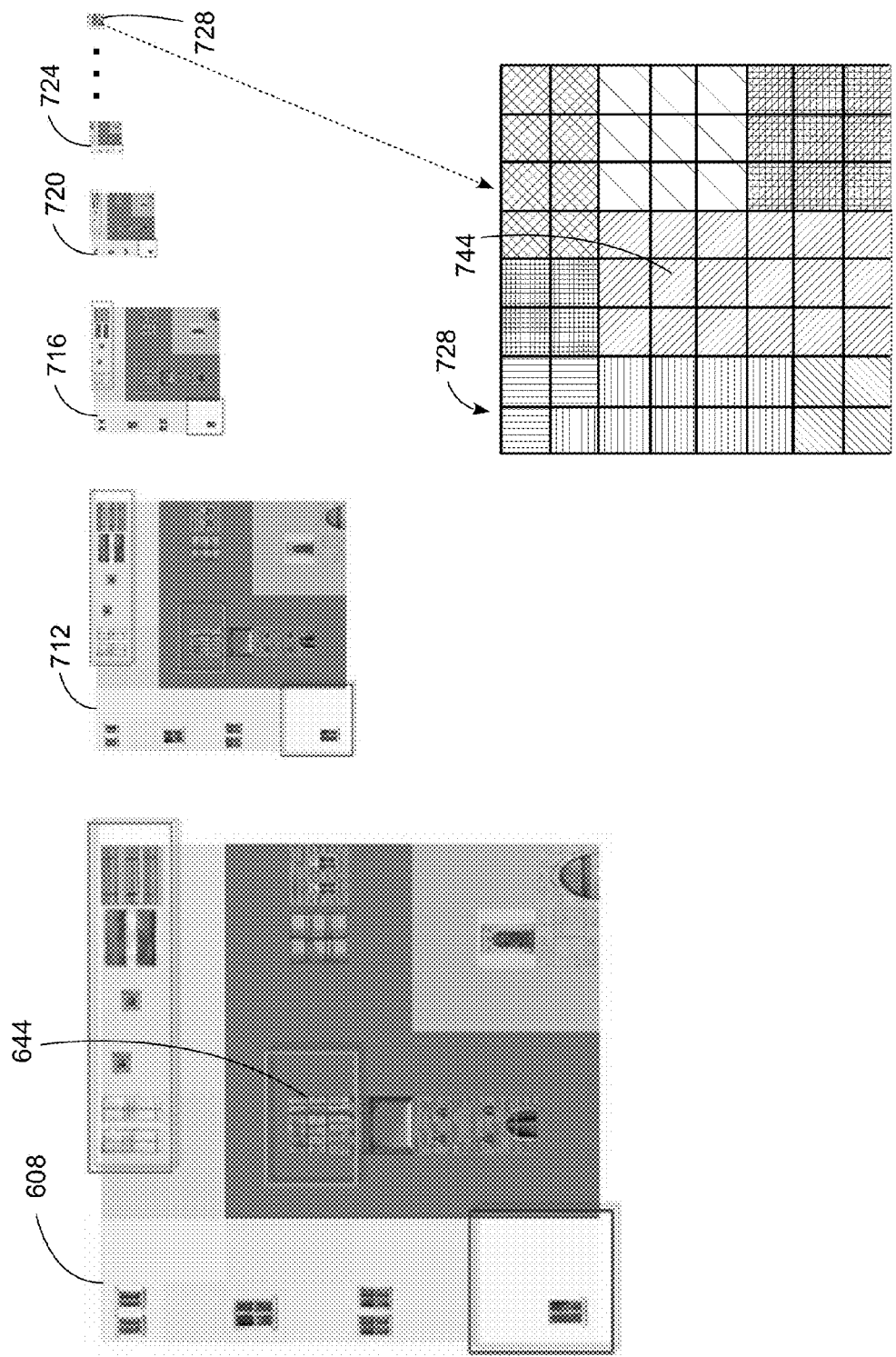
FIG. 7 is an illustrative depiction of mip-map levels for the texture atlas that is depicted in FIG. 6.

FIG. 7 depicts a series of mip-maps 712, 716, 720, 724, and 728 that the processor 108 generates from the texture atlas 608. During process 200, the processor 108 generates the mip-maps 712-728. The lowest-resolution mip-map level 728 is enlarged in FIG. 7, where each of the squares that form the mip-map 728 depicts a single texel. The lowest-resolution mip-map level 728 is also referred to as a "jump level." During process 200, the processor 108 adjusts the colors of texels in the jump level mip-map 728 so that the single texels corresponding to textures in the full-resolution texture atlas 608 are assigned a color of the border-tiles that surround the textures instead of the averaged color of the texture that would be assigned using a traditional mip-map process. For example, in FIG. 7 the texture 644 in the texture atlas 608 corresponds to texel 744 in the jump level mip-map 728. In a prior art mip-mapping process, the color of the texel 744 would correspond to an average color of the texels that form the texture 644 in the texture atlas 608. In the mip-map 728, however, the processor 108 uses the color of the surrounding border texels for the texel 744. The single texels in the mip-map 728 each correspond to the border colors in the protective tiles that are formed in the texture atlas 608. During process 200, the inclusion of the border texels forms a region of the border color that enables the processor 108 to form the smaller mip-map levels with the border color. Thus, higher mip-map levels that include lower resolution images for the texture atlas 608 preserve the border colors that are formed around the groups of textures in the texture atlas 608.

Figure 5:
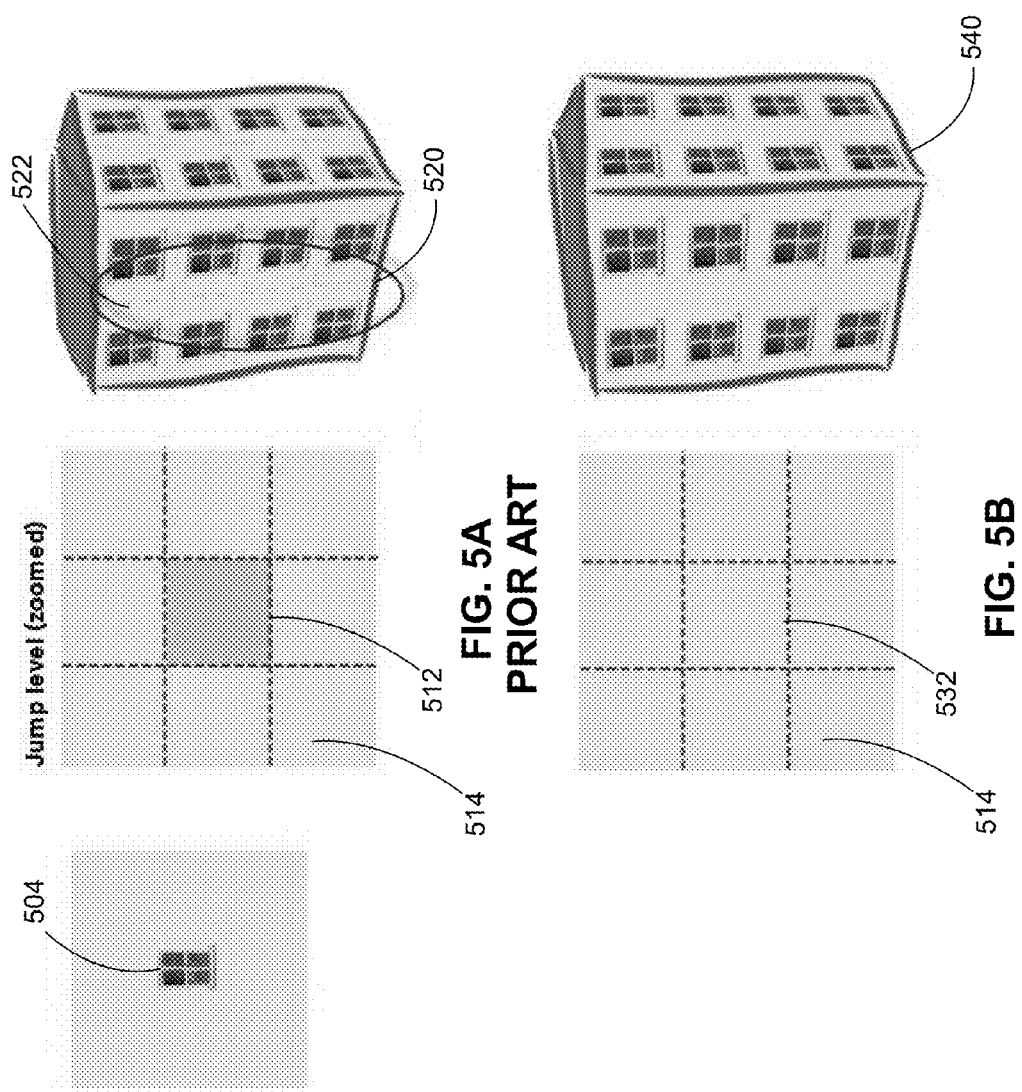
FIG. 5A is a depiction of a mip-mapped texture at a highest ("jump") mip-map level for a texture atlas that produces a visible seam artifact when the texture is applied to an object in a repeated manner in a prior-art graphics configuration.
FIG. 5B is a depiction of another mip-map texture at a highest mip-map level that does not produce a seam artifact when the texture is applied to an object in a repeated manner in the system of FIG. 1.

During generation of a repeated texture that is extracted from the larger texture atlas 608, a potential image artifact is visible as a seam artifact seen in the border of repeating textures. The artifact is caused by the mip-map level selection algorithm used by the processor 108. The mip-map level of each textured pixel is determined with reference to the derivative of texture coordinates u,v (e.g. du and dv). The u and v variables correspond to the x and y axes, respectively, on a two-dimensional plane, but are commonly used when referring to a texture instead of a polygon in a 3D virtual environment. The derivative of the texture coordinates is much larger at the boundary (either horizontally or vertically) of any texture patch that is repeated during the texture mapping process in comparison to the derivative of non-boundary texture coordinates in the u,v plane. As a result, the texels at higher mip-map level will be selected to fill in pixels that are mapped to the border of repetitive texture tile. The sudden jump of the mip-map level selection produces the seam artifact. As depicted in FIG. 5A, the texture 504 is applied in a repeating manner to the structure 520, with a seam artifact 522 between repeated copies of the texture 504. In the example of the structure 520, the jump level texel 512 is a different color than the color of the border texels 514. The artifact 522 between each border is formed from repeated series of nine jump level texels with jump level texel 512 color that do not match the border of the texture 504. Such a level is referred to as a "jump level." The jump level is the level where each texture tile has been shrunken to one texel in the mip-maps. The color of this texel is usually the average color of the original texture tile, which introduces the seam artifact as the color is different from the border color of the original texture tile.

The process 200 generates the texture atlas data 136 to avoid the problems with jump level. Unlike in existing texture atlases, the jump level includes jump texels with the same color as the border colors for the textures and border tiles that are placed in the texture atlas. For example, as depicted in FIG. 7, the highest mip-map level 728 includes individual texels that match the border colors in the full-size texture atlas 608. Thus, the jump level color matches the border color for each of the textures in the texture atlas. As depicted in FIG. 5B, when the texture 504 is included in the texture atlas data 136 with border tiles, the jump level texel 532 is formed with the same color as the border texels 514. When the jump level texel 532 is used during the repeated texture mapping process, the processor 108 maps the repeated textures to the structure 540, which is the same 3D polygon model used for the structure 520 but is rendered without the seam artifact 522.

During process 200, the processor 108 also performs the mip-mapping process with a selected texture filtering technique that is suitable for use with the texture atlas data 136. Mip-map texture filtering refers to the techniques that are used to determine the texture mapped pixel color in an output image from the interpolation between texels in one selected mip-map level or in two neighbouring mip-map levels. In the process 200, the GL_NEAREST_MIPMAP_NEAREST and GL_LINEAR_MIPMAP_NEAREST are suitable filtering techniques for use as for GL_TEXTURE_MIN_FILTER in the OpenGL ES API. The GL_NEAREST_MIPMAP_NEAREST filter specifies the filtering of nearest interpolation within a mip-map level and nearest interpolation between mip-map levels, which uses the color of the closest texel in the closest mip-map level as the border pixel color from the image. The GL_LINEAR_MIPMAP_NEAREST filter specifies the filtering of linear interpolation within the mip-map level and nearest interpolation between mip-map levels, which uses the value from the interpolation between texels in the closest mip-map level as the border pixel color from the image.

The GL_TEXTURE_MIN_FILTER refers to a class of minimization filters that the processor 108 uses to select and filter the texture data from the plurality of images in the different mip-map levels to generate textures for different objects that are positioned at different distances from a view frustum in a virtual environment. Some filtering techniques such as GL_NEAREST_MIPMAP_LINEAR and GL_LINEAR_MIPMAP_LINEAR are susceptible to producing the seam artifacts that are described above due to the color bleeding artifact when the texels at the jump level and those neighbouring mip-map levels are averaged in the filtering process. Thus, during process 200 the processor 108 uses the GL_NEAREST_MIPMAP_NEAREST and GL_LINEAR_MIPMAP_NEAREST filters, or other filters that do not average or combine colors from multiple tiles at different mip-map levels to avoid the generation of seams or other artifacts during texturing.

Process 200 continues as the processor 108 uses one or more shader programs, such as a combination of vertex and fragment shader programs, to select individual textures from the larger texture atlas data 136 and apply the individual textures to objects in the three-dimensional virtual environment (block 220). FIG. 8A is an example code listing of a vertex shader program that generates per-vertex texture coordinates in the texture atlas. FIG. 8B is an example code listing of a fragment shader that uses the coordinates from the vertex shader to apply a portion of the texture atlas to the surface of an object in a repeated manner. The fragment shader of FIG. 8B is configured for a set of sixteen tiles in the texture atlas that are arranged in a 4×4 configuration, but the scaling vector variable s can be adjusted for different numbers and arrangements of tiles in the texture atlas. The vertex shader of FIG. 8A and the fragment shader of FIG. 8B are used in conjunction with mip-mapping to enable generation of output graphics images that depict the texture from a variety of detail levels.

As described above, the processor 108 is only required to bind the texture atlas data 136 once while reusing the individual textures from the texture atlas data 136 to apply different textures to a large number of objects in the virtual environment in an efficient manner. The textures from the texture atlas are applied to the objects in the scene in a batch processing mode that is known to the art for performing efficient graphical operations in the OpenGL API. Some or all of the textures are applied in a repeating manner. For example, in a mapping and navigation program, many buildings are depicted with repeating patterns of brick, stone, or windows. The structure model 540 is an example of an object where the processor 108 performs a repetitive texture operation using the single texture 504 on selected surfaces of the structure 540. After application of the textures to the object model polygons and other processing including lighting and application of other visual effects, the processor 108 displays the objects with the applied textures in the virtual environment through the display device 144.

Figure 3:
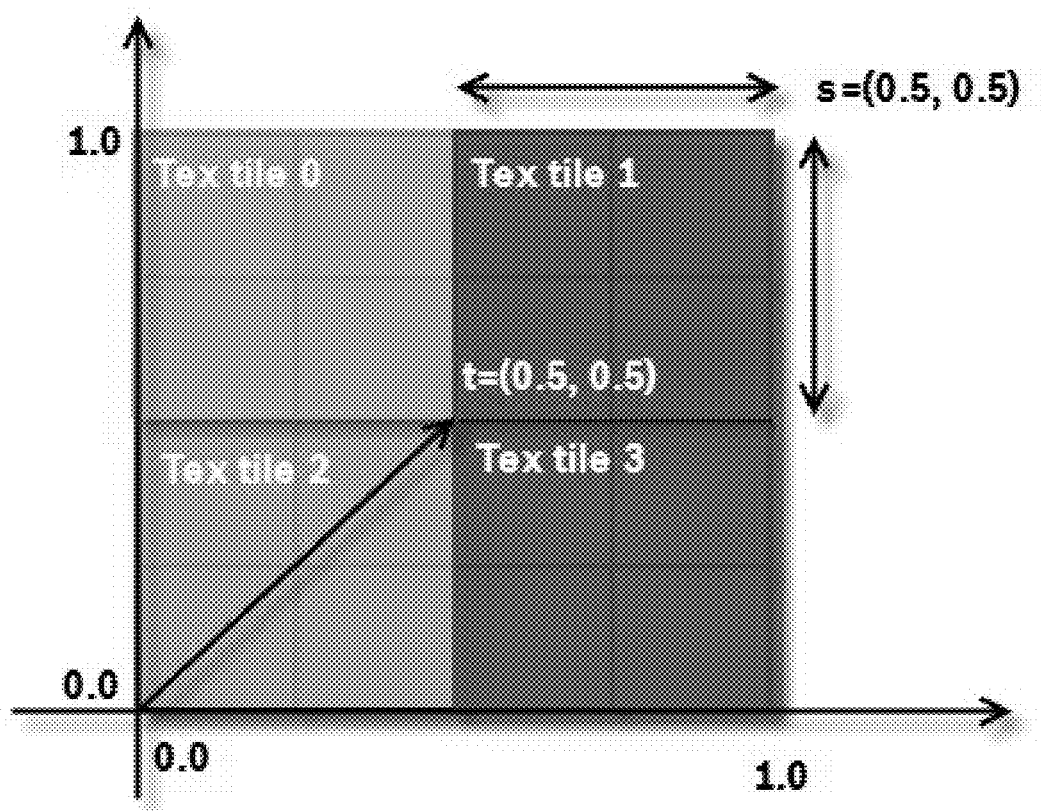
FIG. 3 is a diagram depicting coordinates of segments of a larger texture atlas that correspond to individual textures in the texture atlas.

The processor 108 performs a basic texture coordinate transformation in instances when a texture atlas only consists of non-repetitive texture. FIG. 3 illustrates a texture atlas with 4 different texture tiles. In many cases, the texture coordinates (usually between 0.0 and 1.0) of vertices in a model are defined with respect to a single texture, which has to be put into a texture atlas as a single texture tile. In order to access the same texels using the original texture coordinates of a vertex when a texture atlas is used, the processor 108 identifies the correct texture coordinates for texture atlas based on the original texture coordinates. For example, for a vertex having texture coordinates that reference the bottom left of Tex tile 1, the processor alters the texture coordinates of this vertex from (0.0, 0.0) to (0.5, 0.5) when a texture atlas is used instead of an individual texture. In general, for texture atlas containing only non-repetitive texture tiles, the processor 108 applies a linear transformation to the original texture coordinates to compute the corresponding texture coordinates in the texture atlas according to Equation 1: $f(x)=x \times s+t$. In Equation 1, x represents the original texture coordinates (for a vertex when texture atlas is not used), s represents the scale, which could be calculated by the ratio of the size of texture tile in the atlas to the original size of the tile as a standalone texture, and t is the translation, which is used to locate the starting point of each texture tile. The value of t is determined by the texture tile arrangement scheme in the atlas. Once a texture atlas is created from several non-repetitive textures, the value t for each texture tile will is fixed. In the computing device 104, the data corresponding to locations of textures in the texture atlas are stored in the texture data 132 to identify the individual textures in the larger texture atlas data 136.

When a single texture is used for repetitive texture mapping, the texture coordinates of vertices are usually in the range of [0, n] and n is greater than 1. This value also indicates how many times the texture will be repeated. When a texture atlas is used, the processor 108 adds the repetitive texture to the texture atlas data 136 as a texture tile and transforms the original texture coordinates to the correct ones that can be used to sample the same texel. Given the original texture coordinates x as input, the processor 108 discards the integer part of x and relies only on the fractional part for the texture sampling. This operation is similar to the REPEAT wrap mode that is employed in the texture mapping operations of OpenGL ES. For texture atlas, the GPU 116 in the processor 108 performs the transformation in a fragment shader in OpenGL ES according to Equation 2: $f(x)=\text{fract}(x) \times s+t$. In Equation 2, the fract function returns the fractional portion of each of the coordinates x. Equation 2 applies to both non-repetitive texture tiles and repetitive texture tiles.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method for generating textured graphics comprising:
   identifying with a processor a first border of pixels having a first color around a first image including a first plurality of pixels formed in a first tile;
   identifying with the processor a second border of pixels having a second color around a second image including a second plurality of pixels formed in a second tile, the second tile having a length and a width that is equal to a length and a width of the first tile;
   generating with the processor a third tile formed from a third plurality of texels having the first color, the third tile having a length and a width that is equal to a length and a width of the first tile and the second tile;
   generating with the processor a fourth tile formed from a fourth plurality of texels having the second color, the fourth tile having a length and a width that is equal to a length and a width of the first tile and the second tile;
   generating with the processor a texture atlas including a two-dimensional arrangement of texels including the first tile positioned on one edge of the two-dimensional arrangement of texels with the third tile positioned on at least one side of the first image and the second tile positioned on another edge of the two-dimensional arrangement of texels with the fourth tile positioned on at least one side of the second image; and
   storing with the processor the texture atlas in a memory to enable generation of repeated textures using mip-mapping on an object in a virtual environment using at least one of the first image and the second image as a repeated texture without seam artifacts between repeated textures.

2. The method of claim 1, the generation of the texture atlas further comprising:
   positioning with the processor one side of the first tile including the first image adjacent to one side of the second tile including the second image in the texture atlas in response to the first color being the same as the second color.

3. The method of claim 1, the generation of the texture atlas further comprising:
   positioning with the processor the third tile on a first side of the first tile including the first image and the fourth tile on a second side of the second tile including the second image and another side of the third tile in response to the first color being different than the second color.

4. The method of claim 1 further comprising:
   generating with the processor a mip-map corresponding to the texture atlas and including a plurality of images with different resolutions corresponding to the texture atlas, a lowest-resolution image in the plurality of images including a texel having the first color in a position that corresponds to the first tile in the texture atlas and another texel having the second color in a position that corresponds to the second tile in the texture atlas;
   applying with the processor a texture of the first image to a surface of a graphical object in a repeated pattern using the lowest-resolution image in the mip-map and at least one image in the mip-map with a higher resolution, a boundary between repetitions of the first image including the texel from the lowest-resolution image having the first color; and
   generating with a graphical display device an image of the graphical object with the texture of the first image in the repeated pattern.

5. The method of claim 4, the application of the texture of the first image to the surface of the graphical object further comprising:
   applying with the processor a filter including a nearest interpolation between a plurality of texels within at least one level of the mip-map and nearest interpolation between another plurality of texels in at least two different levels of the mip-map.

6. The method of claim 4, the application of the texture of the first image to the surface of the graphical object further comprising:
applying with the processor a filter including a linear interpolation between a plurality of texels within at least one level of the mip-map and nearest interpolation between another plurality of texels in at least two different levels of the mip-map.

7. A computing system configured to generate textured graphics comprising:
a memory; and
a processor operatively connected to the memory, the processor being configured execute stored program instructions in the memory to:
identify a first border of pixels having a first color around a first image stored in the memory, the first image including a first plurality of pixels formed in a first tile;
identify a second border of pixels having a second color around a second image stored in the memory, the second image including a second plurality of pixels formed in a second tile, the second tile having a length and a width that is equal to a length and a width of the first tile;
generate a third tile formed from a third plurality of texels having the first color, the third tile having a length and a width that is equal to a length and a width of the first tile and the second tile;
generate a fourth tile formed from a fourth plurality of texels having the second color, the fourth tile having a length and a width that is equal to a length and a width of the first tile and the second tile;
generate a texture atlas including a two-dimensional arrangement of texels including the first tile positioned on one edge of the two-dimensional arrangement of texels with the third tile positioned on at least one side of the first image and the second tile positioned on another edge of the two-dimensional arrangement of texels with the fourth tile positioned on at least one side of the second image; and
store the texture atlas in the memory for generation of repeated textures using mip-mapping on an object in a virtual environment using at least one of the first image and the second image as the repeated texture without seam artifacts between the repeated textures.

8. The system of claim 7, the processor being further configured to:
position one side of the first tile including the first image adjacent to one side of the second tile including the second image in the texture atlas in response to the first color being the same as the second color.

9. The system of claim 7, the processor being further configured to:
position the third tile on a first side of the first tile including the first image and the fourth tile on a second side of the second tile including the second image and another side of the third tile in response to the first color being different than the second color.

10. The system of claim 7 further comprising:
a graphical display device; and
the processor being operatively connected to the graphical display device and further configured to:
generate a mip-map corresponding to the texture atlas and including a plurality of images with different resolutions corresponding to the texture atlas, a lowest-resolution image in the plurality of images including a texel having the first color in a position that corresponds to the first tile in the texture atlas and another texel having the second color in a position that corresponds to the second tile in the texture atlas;
apply a texture of the first image to a surface of a graphical object in a repeated pattern using the lowest-resolution image in the mip-map and at least one image in the mip-map with a higher resolution, a boundary between repetitions of the first image including the texel from the lowest-resolution image having the first color; and
generate with the graphical display device an image of the graphical object with the texture of the first image in the repeated pattern.

11. The system of claim 10, the processor being further configured to:
apply a filter including a nearest interpolation between a plurality of texels within at least one level of the mip-map and nearest interpolation between another plurality of texels in at least two different levels of the mip-map.

12. The system of claim 10, the processor being further configured to:
apply a filter including a linear interpolation between a plurality of texels within at least one level of the mip-map and nearest interpolation between another plurality of texels in at least two different levels of the mip-map.

* * * * *